US008665099B2

(12) United States Patent (10) Patent No.: US 8,665,099 B2
Namba et al. (45) Date of Patent: Mar. 4, 2014

(54) INATTENTIVE STATE DETERMINATION DEVICE AND METHOD OF DETERMINING INATTENTIVE STATE

(75) Inventors: Toshiyuki Namba, Edogawa-ku (JP); Hiroaki Sekiyama, Setagaya-ku (JP); Keisuke Okamoto, Sihnagawa-ku (JP); Yoshihiro Oe, Kawasaki (JP); Yoichi Sato, Koto-ku (JP); Yoshihiro Suda, Ota-ku (JP); Takahiro Suzuki, Suginami-ku (JP); Daisuke Yamaguchi, Adachi-ku (JP); Shiro Kumano, Setagaya-ku (JP); Kenichi Horiguchi, Higashimurayama (JP)

(73) Assignees: Toyota Jidosha Kabushiki Kaisha, Toyota-Shi (JP); The University of Tokyo, Tokyo (JP)

( * ) Notice: Subject to any disclaimer, the term of this patent is extended or adjusted under 35 U.S.C. 154(b) by 602 days.

(21) Appl. No.: 12/738,576

(22) PCT Filed: Oct. 16, 2008

(86) PCT No.: PCT/IB2008/002739
§ 371 (c)(1),
(2), (4) Date: Jul. 9, 2010

(87) PCT Pub. No.: WO2009/050564
PCT Pub. Date: Apr. 23, 2009

(65) Prior Publication Data
US 2010/0265074 A1 Oct. 21, 2010

(30) Foreign Application Priority Data
Oct. 16, 2007 (JP) .................................. 2007-269455

(51) Int. Cl.
*G08B 23/00* (2006.01)

(52) U.S. Cl.
USPC .......................... 340/576; 340/901; 340/425.5

(58) Field of Classification Search
USPC ........... 340/576, 573.1, 904, 901–903, 425.5, 340/436, 575, 435, 905, 438
See application file for complete search history.

(56) References Cited

U.S. PATENT DOCUMENTS 5,734,357 A * 3/1998 Matsumoto ..................... 345/7
5,798,687 A * 8/1998 Littlejohn et al. ......... 340/426.23

(Continued)

FOREIGN PATENT DOCUMENTS

| JP | 08-207617 A | 8/1996 |
|---|---|---|
| JP | 3073732 U | 9/2000 |

(Continued)

OTHER PUBLICATIONS

Yoshihiro Suda, et al.: "The Universal Driving Simulator for Human, Vehicle and Traffic Research"; Journal of the Society of Automotive Engineers of Japan, Jun. 7, 2005, pp. 83-88, vol. 59, No. 7, JSAE, Japan.

(Continued)

*Primary Examiner* — Daniel Previl
(74) *Attorney, Agent, or Firm* — Kenyon & Kenyon LLP

(57) ABSTRACT

An inattentive state determination device includes an observed amount acquiring means for acquiring information on the driver's line of sight and at least one of either information on driving operations or information on the traveling state as an observed amount; and an inattentive state determining means for determining the inattentive state of the driver based on the stochastic relationship between the inattentive state and the observed amount as well as the observed amount acquired by using the observed amount acquiring means. In addition, the inattentive state determining means calculates the probability that the driver is driving inattentively and determines that the driver is driving inattentively when the calculated probability exceeds a threshold.

16 Claims, 5 Drawing Sheets

(56) References Cited

U.S. PATENT DOCUMENTS

| | | | |
|---|---|---|---|
| 6,191,686 B1* | 2/2001 | Gabriel | 340/435 |
| 6,198,397 B1* | 3/2001 | Angert et al. | 340/576 |
| 6,218,947 B1* | 4/2001 | Sutherland | 340/576 |
| 6,317,686 B1* | 11/2001 | Ran | 701/533 |
| 6,741,161 B1* | 5/2004 | Kim et al. | 340/7.1 |
| 7,698,032 B2* | 4/2010 | Matsumoto et al. | 701/36 |
| 2004/0047058 A1* | 3/2004 | Unno et al. | 359/883 |
| 2005/0128092 A1* | 6/2005 | Bukman et al. | 340/576 |
| 2006/0077064 A1* | 4/2006 | Baura | 340/575 |
| 2007/0071209 A1* | 3/2007 | Horvitz et al. | 379/201.06 |
| 2007/0168128 A1* | 7/2007 | Tokoro et al. | 701/301 |

FOREIGN PATENT DOCUMENTS

| | | |
|---|---|---|
| JP | 2002-331850 A | 11/2002 |
| JP | 2003-080969 A | 3/2003 |
| JP | 2004-114931 A | 4/2004 |
| JP | 2006-202015 A | 8/2006 |
| JP | 2006-343904 A | 12/2006 |
| JP | 2007-183831 A | 7/2007 |
| JP | 2007-261486 A | 10/2007 |

OTHER PUBLICATIONS

Office Action issued Jan. 10, 2012 in JP 2007-269455 and English translation thereof.

McCll, J.C., et al.: *Visual context capture and analysis for driver attention monitoring*, Intelligent Transportation Systems, 2004, Proceedings, The 7$^{th}$ International IEEE Conference on Washington, DC, US, Oct. 3-6, 2004, Piscataway, NJ, US, IEEE, Oct. 3, 2004, pp. 332-337.

Liang, et al.: *Real-Time Detection of Driver Cognitive Distraction using Support Vector Machines*; IEEE Transactions on Intelligent Transportation Systems, IEEE Service Center, Piscataway, NJ, US, vol. 8, No. 2, Jun. 1, 2007, pp. 340-350.

McCall, J.C., et al.: *Lane Change Intent Analysis Using Robust Operators and Sparse Bayesian Learning*; IEEE Transactions on Intelligent Transportation Systems, IEEE Service Center, Piscataway, NJ, US, vol. 8, No. 3, Sep. 1, 2007, pp. 431-440.

Fletcher, L., et al.: *Correlating driver gaze with the road scene for driver assistance systems*; Robotics and Autonomous Systems, Elsevier Science Publishers, Amsterdam, NL; vol. 52, No. 1, Jul. 31, 2005, pp. 71-84.

Kenji Oka, et al.: "Real-time Modeling of Face Deformation for 3D Head Pose Estimation"; Institute of Industrial Science, The University of Tokyo, vol. 47, No. SIG 10(CVIM 15), Jul. 2006, pp. 185-194.

* cited by examiner

FIG.2

| CATEGORY | OBSERVED AMOUNT |
|---|---|
| DRIVING OPERATIONS | STEERING ANGLE [deg] |
| | ACCELERATOR PEDAL DEPRESSION AMOUNT [%] |
| | BRAKE PEDAL DEPRESSION AMOUNT [%] |
| | TURN SIGNAL SETTINGS [ON/OFF] |
| VEHICLE STATE | SPEED [km/h] |
| | ACCELERATION [m/s²] |
| | DISTANCE BETWEEN VEHICLE AND CENTERLINE [m] |
| | ANGLE BETWEEN VEHICLE AND CENTERLINE [red] |
| DRIVER INFORMATION | HEAD YAW ANGLE [deg] |

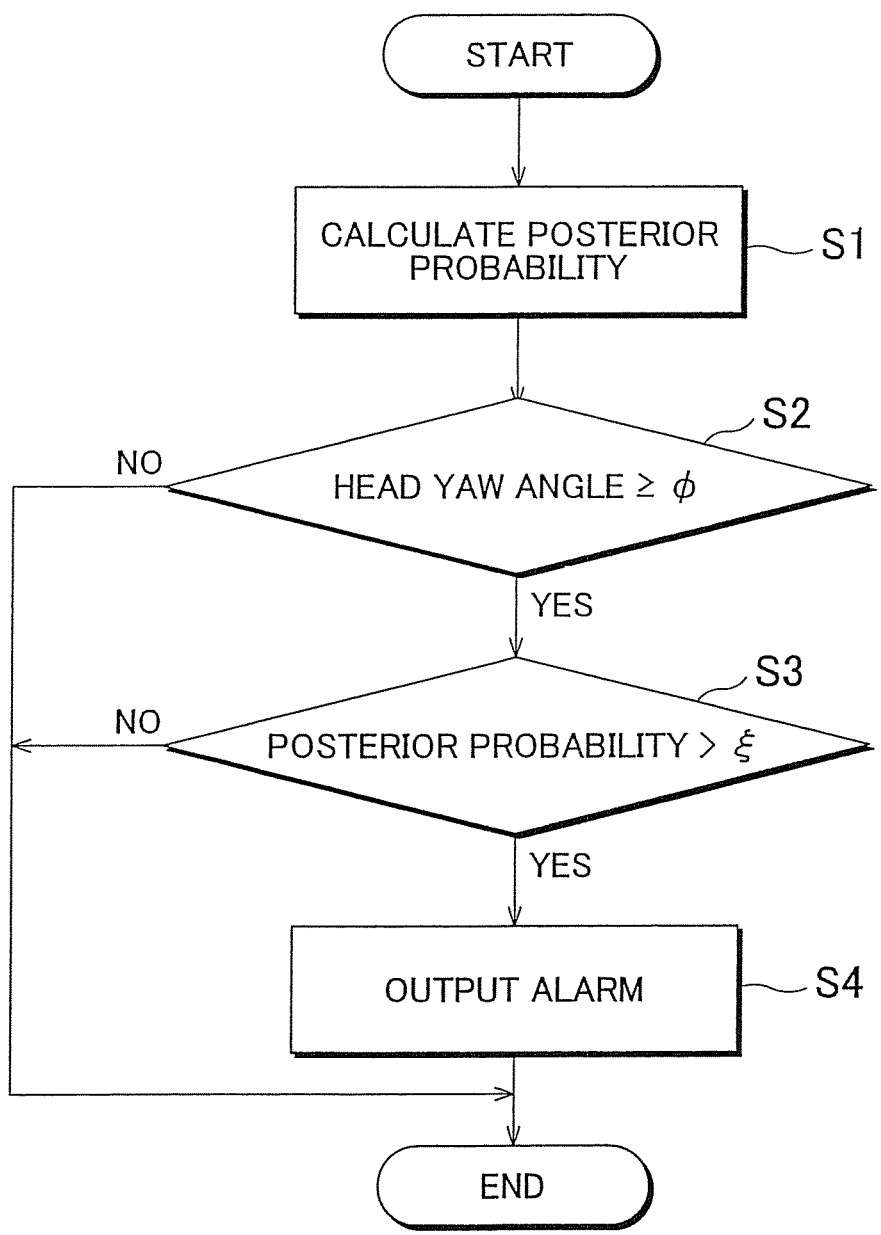

INATTENTIVE STATE DETERMINATION DEVICE AND METHOD OF DETERMINING INATTENTIVE STATE

This is a 371 national phase application of PCT/IB2008/002739 filed 16 Oct. 2008, claiming priority to Japanese Patent Application No. 2007-269455 filed 16 Oct. 2007, the contents of which are incorporated herein by reference.

FIELD OF THE INVENTION

The present invention relates to an inattentive state determination device for determining the inattentive state of a driver and a method of determining inattentive state. In particular, the present invention relates to an inattentive state determination device, wherein information on the driver's line of sight and at least one of either information on driving operations and information on the traveling state are acquired as observed amounts and the current inattentive state is determined based on the stochastic relationship between known inattentive states and known observed amounts as well as current observed amounts.

BACKGROUND OF THE INVENTION

Japanese Patent Application Publication No. 2003-80969 (JP-A-2003-80969) discloses a driver state detecting device for determining whether a driver is driving inattentively based on the frequency of each direction of the driver's line of sight within a predetermined time in the past and the frequency of each angular velocity of the steering angular velocity within a predetermined period in the past.

In this driver state detecting device, preconditions are set in which, when there are other cars in the neighboring lanes and the driver intends to remain in the same lane and the driver is driving attentively, relatively frequent steering operations occur and the steering angular velocity becomes relatively large because the driver intends to stabilize the position of the vehicle, whereas when the driver is driving inattentively, relatively sluggish steering operations occur and the steering angular velocity becomes relatively small, whereby the driver state detecting device determines whether the driver is driving inattentively based on the frequency of each steering angular velocity of the steering angular velocity within a predetermined period in the past when the frequency of each direction of the driver's line of sight within a predetermined time falls within a predetermined state.

As described above, this driver state detecting device is intended to accurately determine whether a driver is driving inattentively when the frequency of each direction of the driver's line of sight within a predetermined time in the past falls within a predetermined state, by determining whether specific preconditions, which are preset based on statistics of steering angular velocity within a predetermined period, are met.

However, in the driver state detecting device according to JP-A-2003-80969, because specific preconditions on observable data (steering angular speed) for determining the occurrence of inattentive driving are defined, the driver state detecting device cannot respond to steering operations that do not apply to such specific preconditions, and therefore the driver state detecting device may determine that inattentive driving is occurring even if the driver is not driving inattentively, or, on the other hand, the driver state detecting device may determine that inattentive driving is not occurring even if the driver is driving inattentively.

SUMMARY OF THE INVENTION

The present invention provides an inattentive state determination device capable of accurately determining whether a driver is driving inattentively and a method of determining inattentive state.

A first aspect of the present invention relates to an inattentive state determination device. This inattentive state determination device is provided with: an observed amount acquiring means for acquiring information on the driver's line of sight and at least one of either information on driving operations and information on the traveling state as an observed amount; and an inattentive state determining means for determining the inattentive state of the driver based on the stochastic relationship between the inattentive state and the observed amount as well as on the observed amount acquired by using the observed amount acquiring means.

The inattentive state determining means may calculate the probability that the driver is driving inattentively and may determine that the driver is driving inattentively when the calculated probability exceeds a threshold.

The inattentive state determining means may calculate the probability that the driver is driving inattentively using a Bayesian network.

The inattentive state determining means may learn a transition model and an observation model in advance to calculate the probability that the driver is driving inattentively based on the transition model and observation model as well as on observed amounts acquired by using the observed amount acquiring means.

The inattentive state determination device may further be provided with an inattentive state learning means for learning a transition model and an observation model. The inattentive state learning means may learn the transition model and the observation model in advance, and the inattentive state determining means may calculate the probability that the driver is driving inattentively based on the transition model and the observation model, which are learned by the inattentive state learning means, and on the observed amounts acquired by using the observed amount acquiring means.

The inattentive state learning means may learn the transition model and the observation model in advance using a driving simulator.

The inattentive state determination device may further be provided with an input device into which the driver inputs whether the results of the determination of the inattentive state are correct or not. In addition, the inattentive state learning means may learn the transition model and the observation model based on the results of the input device.

The information on driving operation may include information on a steering angle, the amount of depression of the accelerator pedal, the amount of depression of the brake pedal, or turn signal operations.

The information on the traveling state may include the speed or the acceleration of the vehicle.

The information on the traveling state may include the distance between the vehicle and a centerline or the angle between the vehicle and a centerline.

The information on the traveling state may include information on ambient environment.

The information on the driver's line of sight may include the angle of inclination of the head of the driver.

The observed amount acquiring means may acquire the head yaw angle, which is the rotational angle around the vertical axis of the head of the driver, as the information on the driver's line of sight.

The inattentive state determination device may further be provided with a voice output device for outputting a sound for attention when the device determines that the driver is driving inattentively.

A second aspect of the present invention relates to a method of determining inattentive state. This inattentive state determination method acquires information on the driver's line of sight and at least one of either information on driving operations or information on the traveling state as an observed amount and determines the inattentive state based on the stochastic relationship between the inattentive state and the observed amount as well as on the acquired observed amount.

With the inattentive state determination device according to the first aspect of the present invention and the method of determining inattentive state according to the second aspect of the present invention, more accurate determination of whether a driver is driving inattentively can be carried out.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is one example of a classification table of observed amounts acquired by the inattentive state determination device;

FIG. 5 is a flowchart showing an operational flow of an attention process for inattentive driving.

DETAILED DESCRIPTION OF THE EMBODIMENTS

Figure 1:
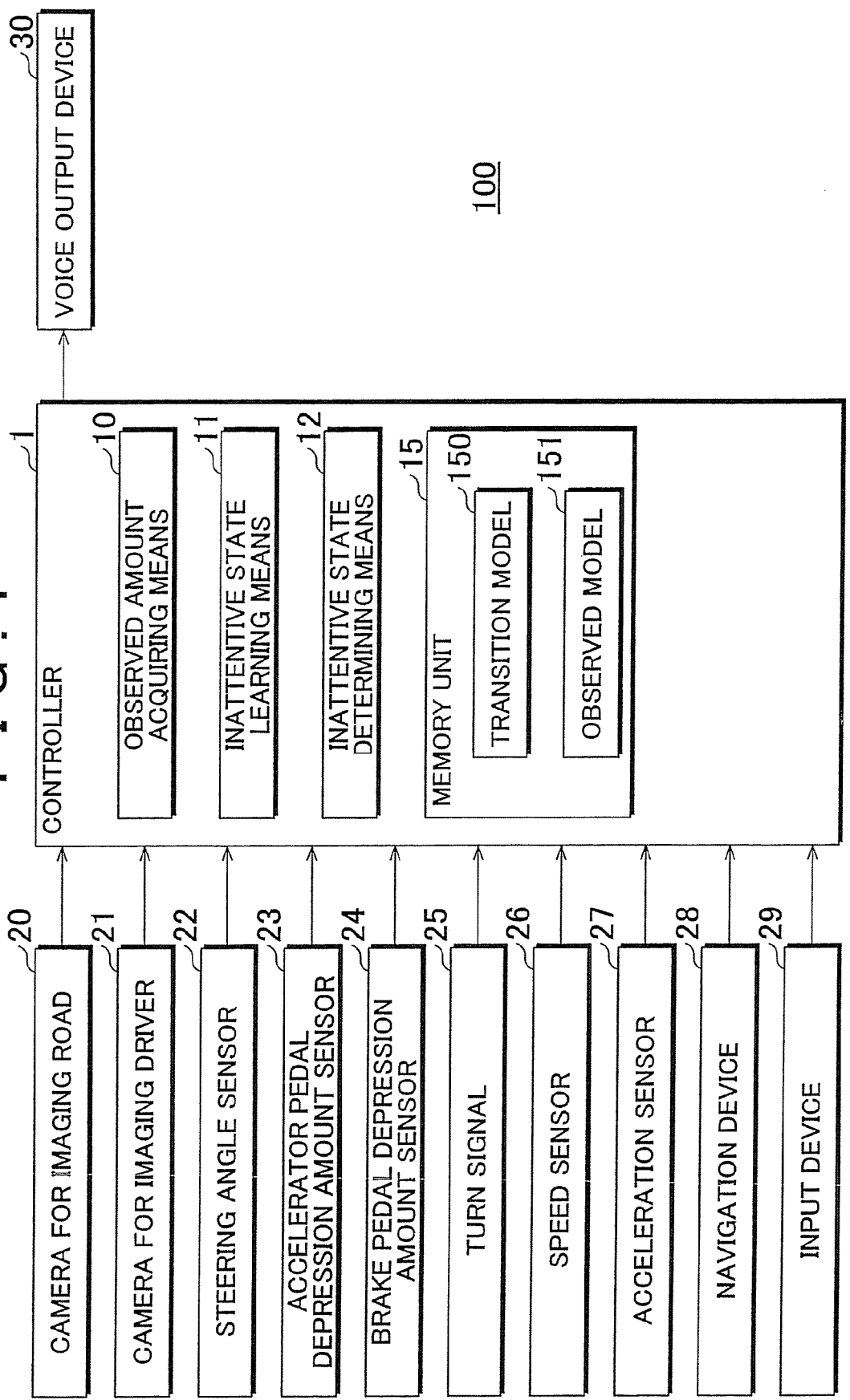
FIG. 1 is a block diagram showing an example configuration of an inattentive state determination device according to an embodiment of the present invention.

FIG. 1 is a block diagram showing an example configuration of an inattentive state determination device according to an embodiment of the invention, wherein the inattentive state determination device 100 is an onboard device that includes a controller 1, devices 20 to 28 for acquiring a variety of observed amounts, an input device 29 for receiving the input of a driver, and a voice output device 30 for outputting various sounds.

"Observed amount" refers to an amount that can be observed as a numerical value, which can be categorized into, for example, categories of "driving operation", "vehicle state", and "driver information" as shown in FIG. 2, and these categories include: "steering angle", "amount of depression of the accelerator pedal"; "amount of depression of the brake pedal", and "turn signal settings" in the "driving operations" category; "speed", "acceleration", "distance between the vehicle and a centerline", and "angle between the vehicle and a centerline" in the "vehicle state" category; and "head yaw angle (a rotational angle around the vertical axis of the head of the driver)" in the "driver information" category. The driving operations can be considered as information on driving operations of the present invention. The vehicle state can be considered as information on the traveling states of the present invention. The driver information can be considered as information on the driver's line of sight of the present invention.

However, preferably, the observed amount may be driver information and at least one of either driving operations or vehicle state.

In addition, the "observed amount" may include anything that is an observable amount and that may affect inattentive states, such as velocity of depression of the accelerator pedal, velocity of depression of the brake pedal, steering angular velocity, vehicle position (e.g., latitude, longitude, altitude), road type (e.g., straight road, winding road, near intersections), ambient environment (e.g., busy streets and scenic spots, which may easily cause inattentive driving, or a highway, which is less prone to cause inattentive driving), presence of pedestrians, speed and acceleration of other vehicles, distance between the host vehicle and other vehicles, pitch angle of the head (a rotational angle around the axis, extending in the lateral direction of the vehicle, of the head of the driver), and roll angle of the head (a rotational angle around the axis, extending in the longitudinal direction of the vehicle, of the head of the driver).

In addition, as for the "observed amount", although a continuous value (analog data) may be employed, a discrete value obtained by discretizing such a continuous value into a plurality of levels (digital data in which, for example, the observed amount of "speed" is discretized into levels at every 5 km/h, such as 5, 10, and 15 km/h) or a plurality of indices (for example, "1" is set as an index of a straight road under road type and "2" is set as an index of a winding road under road type) may be employed.

However, the inattentive state determination device 100 preferably handles a variety of observed amounts by discretizing them each into 12 levels of discrete values. This is because the features of a variety of observed amounts are more difficult to extract at a fewer number of levels, whereas the introduction of noise (abnormal values) cannot be ignored at a larger number of levels.

The inattentive state determination device 100, for example, while continuously acquiring a variety of observed amounts related to the head yaw angle of the driver and the inattentive state, represents the inattentive state, which cannot be observed directly, as a conditional probability based on instantaneous values and statistical values (including average value, maximum value, minimum value, dispersion, median, etc.) of the variety of observed amounts when the head yaw angle of the driver becomes a predetermined angle or larger as well as a predetermined transition model and a predetermined observation model.

The "transition model" is a conditional probability distribution of each state when two or more states change from one to another; that is, for example, it is the distribution of the conditional probability that when a driver is not in an inattentive state at time t ($X_t$=OFF), the driver is brought into an inattentive state at time t+1 ($X_{t+1}$=ON), and it is represented as P ($X_{t+1}$=ON|$X_t$=OFF).

In addition, the "observation model" is a conditional probability distribution of the observed amounts; that is, for example, it is the distribution of the conditional probability that when the driver is in an inattentive state ($X_t$=ON) at time t, an observed amount $Z_t^{(k)}$ is equal to a predetermined value z, and it is represented as P ($Z_t^{(k)}$=z|$X_t$=ON). However, $Z^{(k)}$ shows the value of the k-th observed amount of N observed amounts.

In addition, the inattentive state determination device 100 is, for example, assumed to have the transition model and the observation model installed in advance, and the transition model and the observation model are, for example, learned for every driver in advance using a driving simulator.

Figure 3A:
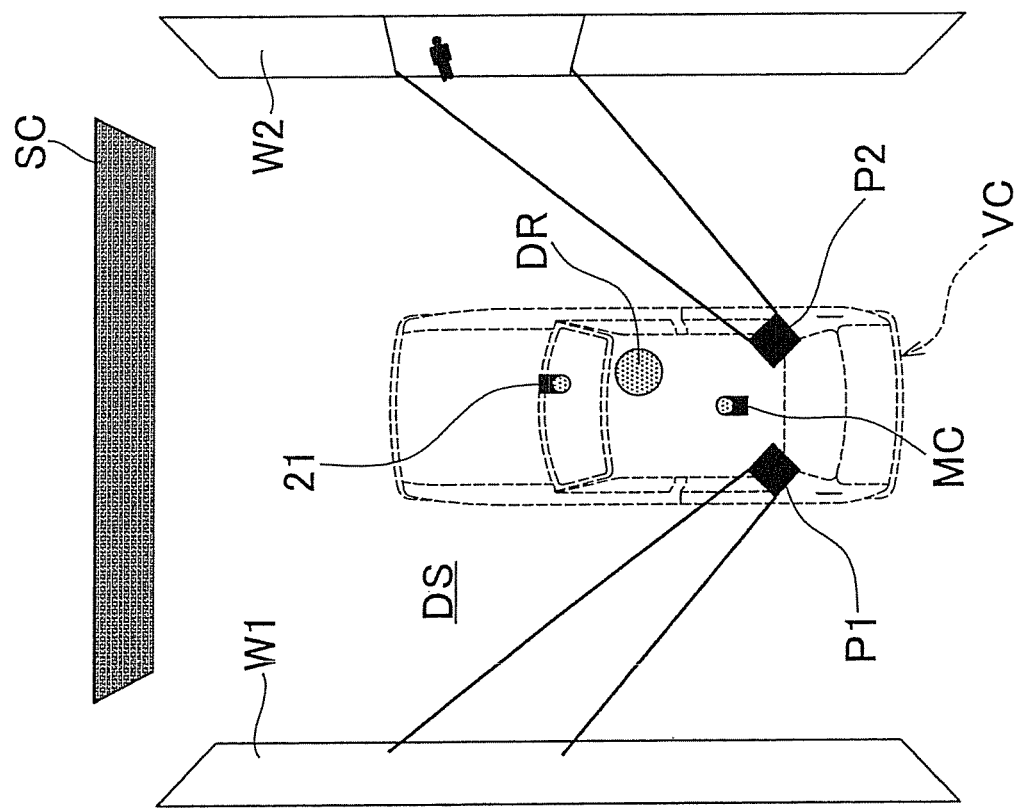
FIGS. 3A and 3B are schematic diagrams showing an example configuration of a driving simulator.

FIG. 3 is a schematic view showing an example configuration of a driving simulator, wherein FIG. 3A shows that a subject (driver) DR can virtually experience driving a car by watching a video played on a screen SC that is linked with a variety of operating parts of a vehicle model VC (not shown, e.g., an accelerator pedal, a brake pedal, a steering wheel, etc.).

FIG. 3A also shows that the driving simulator DS is provided with a camera for imaging a driver 21 located in front of the driver's seat and a monitoring camera MC for monitoring the driving operations of the subject DR located above the driver's seat at the rear thereof.

In addition, FIG. 3A shows that the driving simulator DS is provided with projectors P1 and P2 on the right and left sides of the rear seat for displaying a target image TG that causes inattentive driving of the driver DR, wherein the driver DR cannot visually recognize the target image TG as long as the driver DR does not turn their head (as long as the head yaw angle of the driver does not reach or exceed a predetermined angle $\phi$).

Accordingly, the driving simulator DS is able to detect the head yaw angle of the driver, which is considered the best reflection of the inattentive state, from the images acquired by using the camera for imaging a driver 21.

The driving simulator DS randomly configures the display frequency and the display time of the target image TG, the display position of the target image TG, the type of target image TG, and the like, wherein, for example, the simulator configures the display frequency to 2.2 times per one minute, the display time to 5 seconds per instance, and the type of the target image TG to 50 types, and then projects a projected image PG including the target image TG on a left wall surface W1 and a right wall surface W2 using the left projector P1 and the right projector P2.

Figure 3B:
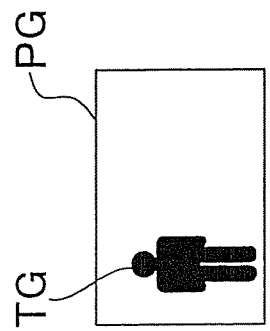

FIG. 3B is one example of the projected image PG projected on the right wall surface W2, and it shows the state in which the projected image PG includes a target image TG with the shape of a pedestrian on the left side area.

However, the driving simulator DS may use, as the target image TG, images other than pedestrians that attract the driver's interest, such as road signs, 4-character idioms, or the like, and may also use voice signals for announcing whether the target image TG is displayed on the left or the right so that the subject DR naturally drives inattentively without experiencing mental stress.

In addition, the driving simulator DS defines the state of the occurrence of inattentive driving as the state in which the head yaw angle of the subject DR is $\phi$ (e.g., ±10°) or larger and the target image TG is displayed, and then has the subject DR repeat virtual-driving for a predetermined number of times (this action is referred to as teacher assisted learning).

However, the state in which the driver is driving inattentively may be defined by using observed amounts other than the head yaw angle of the driver, and the state in which the driver is driving attentively may be defined by using any of the observed amounts (for example, the state in which the steering angle is at a prescribed angle or larger is defined as a state in which the driver is driving attentively even when the head yaw angle is $\phi$ or larger).

The driving simulator DS learns (generates) the transition model and the observation model based on a variety of observed amounts acquired in accordance with the above-described method.

However, the transition model and the observation model are derived based on the number of frames (a prescribed temporal unit, such as the frame in the imaging unit (frames/second) of the camera for imaging a driver 21).

Specifically, the transition model is represented by equation (1) and the observation model is represented by equation (2).

$$P(X_{t+1} = i \mid X_t = j)_{i,j \in \{ON, OFF\}} = \frac{\text{Frames}\{(X_{t+1} = i) \text{ and } (X_t = j)\}}{\text{Frames}\{X_t = j\}} \quad (1)$$

$$P(Z_t^{(k)} = z \mid X_t = i)_{i \in \{ON, OFF\}} = \frac{\text{Frames}\{(Z_t^{(k)} = z) \text{ and } (X_t = i)\}}{\text{Frames}\{X_t = i\}} \quad (2)$$

In these equations, frame {y} refers to the number of frames that meet condition y.

Referring again to FIG. 1, components of the inattentive state determination device 100 are described below.

The controller 1 is a computer provided with a CPU (Central Processing Unit) and a memory unit 15 such as a Random Access Memory (RAM) and a Read Only Memory (ROM), wherein, for example, the controller 1 stores, in the memory unit 15, programs corresponding to an observed amount acquiring means 10, an inattentive state learning means 11, and an inattentive state determining means 12, respectively, while allowing the CPU to execute processes corresponding to such means.

The memory unit 15, for example, stores a transition model 150 and an observation model 151 that are learned by using the driving simulator DS for every driver and allows the inattentive state determination device 100 to selectively use a transition model 150 and an observation model 151 corresponding to each driver who drives the car.

A camera for imaging a road 20 is a camera for recognizing road boundary lines, road signs, and the like installed on a road, and the camera 20 is, for example, installed around the front grill to image lane boundary lines and the like on the road on which the host vehicle is traveling.

A camera for imaging a driver 21 is a camera for imaging the driver, and for example, installed in the instrumental panel, on the dashboard, or the like to image the head of the driver. However, the camera for imaging a driver 21 preferably has the same arrangement as, and is the same type as, the one used in the driving simulator DS. This is because the transition model 150 and the observation model 151 acquired by using the driving simulator DS can be used effectively.

A steering angle sensor 22 is a sensor for measuring the rotational angle of the steering shaft associated with the steering angle of the wheels. The steering angle sensor 22, for example, detects the rotational angle of the steering shaft by reading magnetoresistance, which is generated by magnets embedded in the steering shaft, with an MR (Magnetic Resistance) element and the detected results are output to the controller 1.

A sensor for the amount of depression of the accelerator pedal 23 is a sensor for detecting the amount of depression of the accelerator pedal. The sensor 23, for example, detects the amount of depression of the accelerator pedal by using a potentiometer with a rheostat and the detected results are output to the controller 1.

A sensor for the amount of depression of the brake pedal 24 is, similar to the sensor for the amount of depression of the accelerator pedal 23, a means for detecting the amount of depression of the brake pedal.

Turn signals 25 are devices for indicating the direction of travel of the host vehicle. The turn signals, for example, indicate the direction of travel of the host vehicle outside by blinking the turn signal lamps and output an electric signal indicating that state to the controller 1.

A speed sensor 26 is a sensor for measuring the speed of a vehicle, wherein, for example, the changes in magnetic field caused by magnets that are installed in each wheel and rotated with each wheel are read by the MR element in the form of magnetoresistance and the rotational speed of the wheels and the speed of the vehicle are detected by retrieving the magnetoresistance as pulse signals proportional to the rotational speed, and then the detected results are output to the controller 1.

An acceleration sensor 27 is a sensor for detecting the acceleration of a vehicle. The acceleration sensor 27, for example, detects the acceleration of the vehicle in the triaxial directions of a longitudinal direction, a vertical direction, and a lateral direction by using a semiconductor strain gauge and outputs the detected results to the controller 1.

A navigation device 28 is a device for navigating the vehicle by indicating the route to the destination based on positional information of the vehicle acquired by using a Global Positioning System (GPS) function and map information stored in a hard disk, DVD, or the like. The navigation device 28 outputs information on the position of the host vehicle (latitude, longitude, altitude), the type of the road on which the host vehicle is traveling (e.g., straight road, winding road, near an intersection), or ambient environment (e.g., busy streets and/or scenic spots that may easily cause inattentive driving or a highway less prone to cause inattentive driving) to the controller 1.

The input device 29 is a device for receiving inputs from a user, which is, for example, a steering switch installed on the steering wheel that allows the driver to input feedback as to whether the results of determination by the inattentive state determination device 100 are correct or not, and the input information from the driver is output to the controller 1.

The voice output device 30 is a device for outputting voice messages, alarms, or the like, which comprises, for example, onboard speakers or an alarm. The voice output device 30 outputs attention messages and alarm tones in response to controlling signals sent from the controller 1 when it is determined that the driver is driving inattentively by the inattentive state determination device 100.

Next, a variety of means composing the controller 1 will be described below.

The observed amount acquiring means 10 is a means for acquiring a variety of observed amounts, which continuously acquires the outputs from the devices 20 to 28 for acquiring the variety of observed amounts while the acquired observed amounts are stored in the memory unit 15. However, the observed amount acquiring means 10 may be configured to reflect the most recently acquired observed amounts on the statistics and then delete or discard the observed amounts.

The observed amount acquiring means 10 may be configured to be able to use all of the observed amounts acquired over all periods from the starting time of driving to the current time or to use only observed amounts acquired within a predetermined period in the past.

In addition, the observed amount acquiring means 10 receives images of the road output from the camera for imaging a road 20 and extracts road signals, lane lines, and the like by applying image processes such as a binarization process, an edge detection process, and the like.

Furthermore, the observed amount acquiring means 10 calculates the distance between the host vehicle and a lane line or the angle between the host vehicle and a lane line from the relationship between the extracted lane line and the known camera position.

In addition, the observed amount acquiring means 10, for example, receives images of the head of the driver output from the camera for imaging a driver 21, detects the position of the head of the driver using an available method of estimating the position of the head, and derives the yaw angle, the pitch angle, and the roll angle of the head of the driver.

Furthermore, the observed amount acquiring means 10 may be configured to estimate the direction of the driver's line of sight by receiving images of the face of the driver output from the camera for imaging a driver 21 and extracting the position of the eyes, the nose, and the mouth in the face or by extracting the position of the pupils in the eyes by applying image processes such as a binarization process, an edge detection process, or the like.

The inattentive state learning means 11 is a means for inducing learning in the transition model 150 and the observation model 151. When, for example, the inattentive state determination device 100 determines that the driver is driving inattentively and allows the voice output device 30 to output a warning, but the device subsequently detects that the driver is not driving inattentively via the input device 29, the fact that the determination result is wrong is reflected on the transition model 150 and the observation model 151.

In addition, the inattentive state learning means 11 distinguishes a driver by using a driver distinguishing means such as a fingerprint authentication device, an iris authentication device, a password, or the like and then updates the transition model 150 and the observation model 151 for every driver. This is for improving the accuracy of the determination of the driver's inattentive driving with the inattentive state determining means 12 (described below) by gathering the characteristics of each driver while preparing the transition model 150 and the observation model 151.

Accordingly, the inattentive state learning means 11 can continuously improve the accuracy of the determination of inattentive driving made by the inattentive state determination device 100.

The inattentive state determining means 12 is a means for determining whether the driver is driving inattentively, wherein, for example, by using a dynamic Bayesian network (hereinafter referred to as "DBN"), it derives the probability of inattentive driving at the current time based on a variety of observed amounts acquired up to the current time and then determines that the driver is driving inattentively when the derived probability is a prescribed value $\xi$ (e.g., 0.8) or larger.

The prescribed value $\xi$ is, for example, determined by estimating the accuracy of the inattentive driving based on the leave-one-out method with respect to the results of a plurality of simulations in the driving simulator DS, taking into consideration the values of: TP (True Positive: True-positive rate, referring to the ratio at which the inattentive driving state is determined to be inattentive driving); FP (False Positive: False-positive rate, referring to the ratio at which the attentive driving state is determined to be inattentive driving); FN (False Negative: False-negative rate, referring to the ratio at which the inattentive driving state is determined not to be inattentive driving); and TN (True Negative: True-negative rate, referring to the ratio at which the attentive driving state is determined not to be inattentive driving).

The DBN is a technique for describing a stochastic relationship using a directed graph when there is a stochastic relationship between a hidden state variable (a variable that cannot be acquired directly from the history of observed amounts, such as the inattentive state) and an observed variable (a variable that can be acquired directly from the history of observed amounts, such as head yaw angle, speed, acceleration, etc.).

The DBN stochastically calculates the validity of the value of the hidden state variable at a given time from the history of the state of the observed variable until the given time by assuming a constant relationship and learning it quantitatively.

In the present embodiment, it is assumed that the hidden state variable (inattentive state) is subject to a first-order Markov process and that the hidden state variable (inattentive state) at each time point affects the observed variable at the time point.

Figure 4:
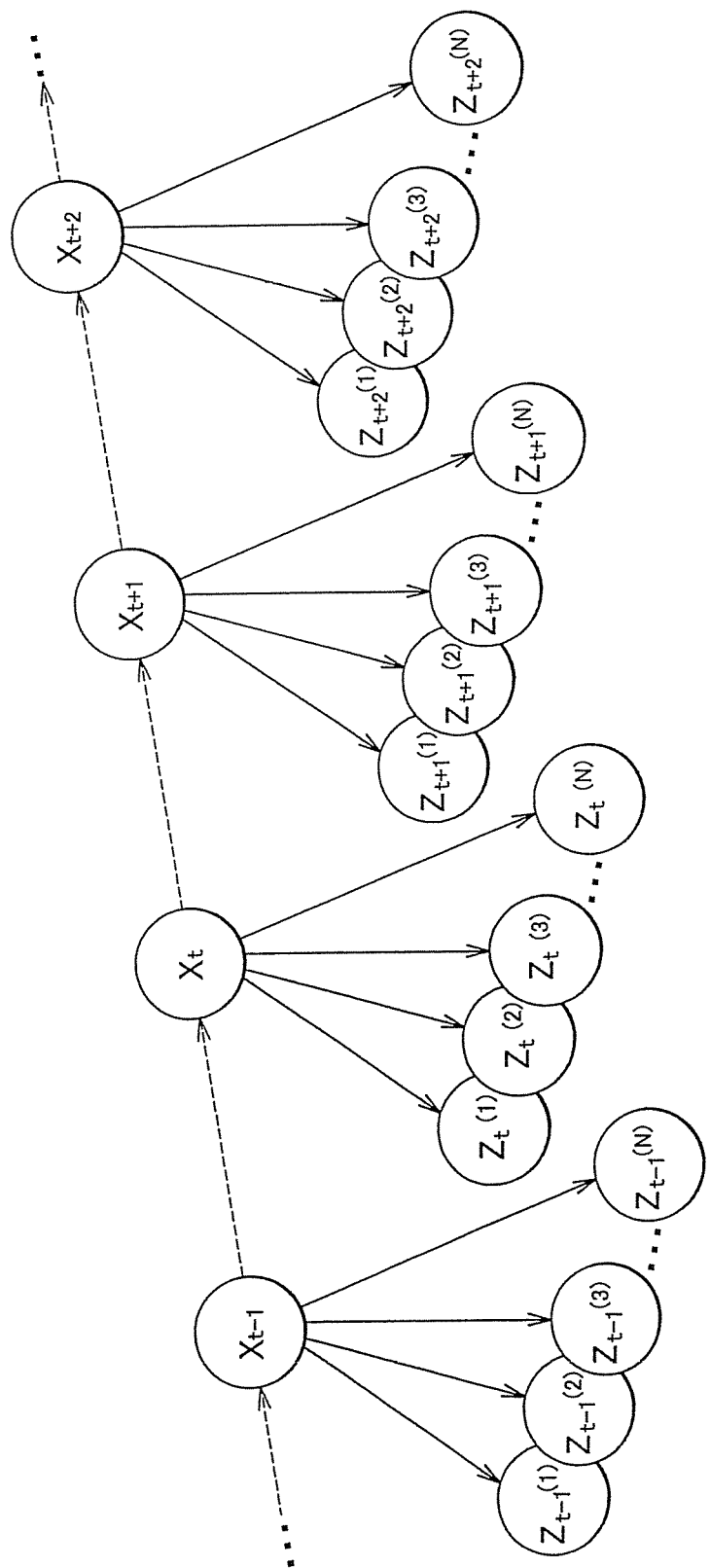
FIG. 4 is an outline view showing a network topology of a DBN.

FIG. 4 is an outline view showing a network topology of the DBN, in which the transition of the hidden state variable subject to the first-order Markov process is represented in an arrow with a dashed line, and how the hidden state variable (inattentive state) at each time point affects the observed variable at the time point is represented in an arrow with a solid line.

In the figure, $X_t$ represents a value of the hidden state variable (inattentive state) at the time t, while Zt ($Z_t = \{Z_t^{(1)}, \ldots, Z_t^{(N)}\}$) represents the observed variable (head yaw angle, speed, acceleration, etc.) at the time t, wherein $X_t$ takes a value of either ON (inattentive state) or OFF (attentive state) and N is the number of types of observed variables. In addition, each observed variable $Z_t^{(k)}$ has a discrete value acquired by discretizing continuous amounts, and the discrete value of each observed variable is, for example, discretized into 12 levels.

Equation (3) is an equation for obtaining a posterior probability P ($X_t|Z_{1:t}$) of an inattentive state $X_t$ at the time t based on information $Z_{1:t}$ for all observed amounts from the time of starting acquisition of the observed amounts to the time t. In the DBN, the equation (3) is used to derive the probability of inattentive driving when each observed amount is a predetermined value. However, the "posterior probability" is one type of conditional probability, and in the present embodiment, it represents the likelihood of inattentive driving in consideration of the observed amounts that are previously acquired.

$$P(X_{t+1} \mid Z_{1:t+1}) = \prod_{k=1}^{N} P(X_{t+1} \mid Z_{1:t+1}^{(k)}) \qquad (3)$$

$$= \alpha \prod_{k=1}^{N} P(Z_{t+1}^{(k)} \mid X_{t+1}, Z_{1:t}^{(k)}) P(X_{t+1} \mid Z_{1:t}^{(k)})$$

$$= \alpha \prod_{k=1}^{N} P(Z_{t+1}^{(k)} \mid X_{t+1}) P(X_{t+1} \mid Z_{1:t}^{(k)})$$

$$= \alpha \prod_{k=1}^{N} P(Z_{t+1}^{(k)} \mid X_{t+1}) \sum_{x_t \in X_t} P(X_{t+1} \mid x_t) P(x_t \mid Z_{1:t}^{(k)})$$

Wherein, α is a constant representing P ($Z_{t+1}$), P ($Z_{t+1}^{(k)}|X_{t+1}$) is determined by using the observed model 151 stored in the memory unit 15, and P ($X_{t+1}|x_t$) is determined by using the transition model 150 stored in the memory unit 15.

Therefore, the posterior probability of inattentive driving at the current time P ($X_t$=ON$|Z_{1:t}$) is derived by deriving P ($x_t|Z_{1:t}^{(k)}$) based on the observed amount $Z_{1:t}$ that is observed until that point.

The inattentive state determining means 12 compares the posterior probability of inattentive driving at the current time P ($X_t$=ON$|Z_{1:t}$) derived by using DBN as described above and the predetermined value ξ (e.g., 0.8). When the posterior probability P ($X_t$=ON$|Z_{1:t}$) is the predetermined value ξ or larger, it is determined that the current state (in this case, it is the state in which the head yaw angle is ϕ or larger) is inattentive driving.

Next, the process in which the inattentive state determination device 100 calls for the driver's attention to their inattentive driving (hereinafter referred to as "attention process for inattentive driving") is described below with reference to FIG. 5. FIG. 5 is a flowchart showing the operational flow of the attention process for inattentive driving. The inattentive state determination device 100 repeats the attention process for inattentive driving while the vehicle is traveling at a prescribed speed or faster.

First, the controller 1 of the inattentive state determination device 100 calculates the posterior probability of inattentive driving at the current time by using the DBN by the inattentive state determining means 12 (Step S1).

The controller 1 then, by the observed amount acquiring means 10, derives the head yaw angle of the driver based on the image output from the camera for imaging a driver 21 and compares the head yaw angle and the prescribed angle ϕ (step S2).

When the head yaw angle is less than the predetermined angle ϕ (NO in step S2), the controller 1 temporarily terminates the attention process for inattentive driving. This is because if the head yaw angle is less than the predetermined angle ϕ, there is no need to call for the driver's attention.

When the head yaw angle is at a predetermined angle ϕ or larger (YES in step S2), the controller 1 compares the calculated posterior probability and the predetermined value ξ (step S3) by the inattentive state determining means 12, and when the calculated posterior probability is at the predetermined value ξ or lower (NO in step S3), the controller 1 temporarily terminates the attention process for inattentive driving. This is because if the calculated posterior probability is low, there is no need to call for the driver's attention, and this prevents alarms from being output when attention is unnecessary.

When the calculated posterior probability is greater than the predetermined value ξ (YES in step S3), the controller 1 sends a control signal to the voice output device 30 to output an alarm to call for the driver's attention so as to stop the inattentive driving (step S4) and then ends the attention process for inattentive driving.

However, in the attention process for inattentive driving shown in FIG. 5, the posterior probability of the inattentive driving at the current time may be calculated by using the DBN only if the head yaw angle is at the predetermined angle ϕ or larger.

This is because there is a case in which the head yaw angle derived by the observed amount acquiring means 10 is treated as a discrete value and at the same time the predetermined angle ϕ is included at the midpoint of one section (for example, a case in which the level is discretized at intervals of ±4°, wherein the predetermined angle ϕ (±10°) is included in the section between ±8° and ±12°). In this case, the head yaw angle ±8° and the head yaw angle ±10° are treated as the same discrete value. This means that there is a possibility that the driver may be determined to be driving inattentively even if the head yaw angle is less than the predetermined angle ϕ.

With the above-mentioned configuration, because the inattentive state determination device 100 determines whether the driver is driving inattentively while, with the use of the stochastic relationship between a variety of observed amounts and the inattentive state, calculating the probability of inattentive driving that cannot be observed directly, the inattentive state determination device 100 can more accurately determine whether inattentive driving is occurring.

In addition, because the inattentive state determination device 100 determines the inattentive state by using the stochastic relationship between a variety of observed amounts and the inattentive state, the inattentive state determination device 100 can flexibly deal with the relationship between a variety of observed amounts and inattentive states in which the fixed law cannot be found at a glance, and the device can therefore more accurately determine whether inattentive driving is occurring.

Furthermore, the inattentive state determination device 100 can more accurately distinguish cases in which the driver's line of sight is deviated from the forward direction without causing inattentive driving like when making sure of safety when turning left or right, changing lanes, etc. from cases in which the driver's line of sight is deviated from the forward direction due to the driver's inattentive driving, so that the inattentive state determination device 100 can prevent the alarm from being output (alarm output based on a mistaken determination) in cases in which it is not inattentive driving but the driver's line of sight is deviated from the forward direction.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

For example, in the abovementioned embodiment, the stochastic relationship between the observed amounts output from the devices 20 to 28 and the inattentive state is described in the DBN, and whether the driver is driving inattentively is determined by calculating the posterior probability of inattentive driving of the driver. However, the inattentive state determination device may be configured to determine whether the driver is driving inattentively while inputting the distance between vehicles output by a radar sensor, the type of lane (driving lane or passing lane) output by a road-to-vehicle communication device, or the like as well as other observed amounts into the DBN.

In addition, the inattentive state determination device may also determine whether the driver is driving inattentively or not by using other probability models such as a neural network.

The invention claimed is:

1. An inattentive state determination device, comprising: observed amount acquiring means for acquiring information on a driver's line of sight and information on how the driver is operating the vehicle and information on how the vehicle is traveling as an observed amount; and
    inattentive state determining means for determining an inattentive state of a driver based on the relationship between the inattentive state and the observed amount as well as on a current observed amount regarding information on driving operations and information on a traveling state acquired by using the observed amount acquiring means; and
    based on a current observed amount regarding the driver's line of sight acquired by using the observed amount acquiring means.

2. The inattentive state determination device according to claim 1, wherein the inattentive state determining means calculates a probability that the driver is driving inattentively and determines that the driver is driving inattentively when the calculated probability exceeds a threshold.

3. The inattentive state determination device according to claim 2, wherein the inattentive state determining means calculates the probability that the driver is driving inattentively by using a Bayesian network.

4. The inattentive state determination device according to claim 2, wherein the inattentive state determining means learns a transition model and an observation model in advance to calculate the probability that a driver is driving inattentively based on the transition model and observation model as well as the observed amount acquired by using the observed amount acquiring means.

5. The inattentive state determination device according to claim 2, further comprising:
    inattentive state learning means for learning a transition model and an observation model, wherein
    the inattentive state learning means learns the transition model and the observation model in advance, and
    the inattentive state determining means calculates the probability that the driver is driving inattentively based on the transition model and the observation model, which are learned by the inattentive state learning means, and on the observed amount acquired by using the observed amount acquiring means.

6. The inattentive state determination device according to claim 5, wherein the inattentive state learning means learns the transition model and the observation model in advance using a driving simulator.

7. The inattentive state determination device according to claim 6, further comprising an input device into which a driver inputs whether the results of the determination of the inattentive state are correct or not, wherein, the inattentive state learning means learns the transition model and the observation model based on the results of the input device.

8. The inattentive state determination device according to claim 1, wherein the information on how the driver is operating the vehicle includes information on a steering angle, an amount of depression of the accelerator pedal, an amount of depression of the brake pedal, or turn signal operations.

9. The inattentive state determination device according to claim 1, wherein the information on how the vehicle is traveling includes the speed or the acceleration of the vehicle.

10. The inattentive state determination device according to claim 1, wherein the information on how the vehicle is traveling includes a distance between the vehicle and a centerline or an angle between the vehicle and a centerline.

11. The inattentive state determination device according to claim 1, wherein the information on how the vehicle is traveling includes information on ambient environment.

12. The inattentive state determination device according to claim 1, wherein the information on the driver's line of sight includes an angle of inclination of a head of the driver.

13. The inattentive state determination device according to claim 1, wherein the observed amount acquiring means acquires a head yaw angle, which is a rotational angle around a vertical axis of a head of the driver, as the information on the driver's line of sight.

14. The inattentive state determination device according to claim 1, further comprising a voice output device for outputting a sound for attention when the device determines that the driver is driving inattentively.

15. An inattentive state determination device, comprising:
    an observed amount acquisition unit for acquiring information on a driver's line of sight and information on how the driver is operating the vehicle or information on how the vehicle is traveling as an observed amount; and
    inattentive state determining unit for determining an inattentive state of a driver based on the relationship between the inattentive state and the observed amount as well as on a current observed amount regarding information on driving operations and information on a traveling state acquired by using the observed amount acquiring unit; and based on a current observed amount regarding the driver's line of sight acquired by using the observed amount acquiring unit.

16. An inattentive state determination method, comprising:

acquiring information on a driver's line of sight and information on how the driver is operating the vehicle and information on how the vehicle is traveling as an observed amount; and determining an inattentive state of a driver based on a relationship between the inattentive state and the observed amount as well as an acquired observed amount regarding information on driving operations and information on a traveling state.

* * * * *

UNITED STATES PATENT AND TRADEMARK OFFICE
CERTIFICATE OF CORRECTION

PATENT NO. : 8,665,099 B2  
APPLICATION NO. : 12/738576  
DATED : March 4, 2014  
INVENTOR(S) : Namba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this

Twenty-ninth Day of September, 2015

Michelle K. Lee  
*Director of the United States Patent and Trademark Office*